US009842006B2

(12) United States Patent
Kaplinger et al.

(10) Patent No.: US 9,842,006 B2
(45) Date of Patent: Dec. 12, 2017

(54) APPLICATION PROCESSING ALLOCATION IN A COMPUTING SYSTEM

(75) Inventors: Todd Eric Kaplinger, Raleigh, NC (US); Aaron Kyle Shook, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 694 days.

(21) Appl. No.: 12/628,326

(22) Filed: Dec. 1, 2009

(65) Prior Publication Data

US 2011/0131329 A1    Jun. 2, 2011

(51) Int. Cl.
*G06F 15/16*    (2006.01)
*G06F 9/50*    (2006.01)

(52) U.S. Cl.
CPC .................. *G06F 9/5083* (2013.01)

(58) Field of Classification Search
CPC .................. G06F 9/5083; G06F 9/547
USPC .......................................... 709/226
See application file for complete search history.

(56) References Cited

U.S. PATENT DOCUMENTS

| 6,137,793 | A  | * | 10/2000 | Gorman .................. H04H 60/97 348/E7.07 |
| 7,321,992 | B1 | * | 1/2008 | Vellore .................. G06F 11/004 714/13 |
| 7,437,450 | B1 | * | 10/2008 | Gore ..................... H04L 41/5009 702/186 |
| 7,490,073 | B1 |   | 2/2009 | Qureshi et al. |
| 7,539,985 | B2 | * | 5/2009 | Marvin ..................... G06F 8/71 717/170 |
| 2002/0198895 | A1 |   | 12/2002 | Arnold et al. |
| 2004/0015578 | A1 | * | 1/2004 | Karakashian ........... H04L 67/02 709/223 |
| 2005/0044233 | A1 | * | 2/2005 | Cai ......................... H04L 29/06 709/227 |
| 2005/0257216 | A1 |   | 11/2005 | Cornell et al. |
| 2005/0283786 | A1 | * | 12/2005 | Dettinger ............... G06Q 10/10 718/104 |
| 2006/0015773 | A1 | * | 1/2006 | Singh et al. .................... 714/13 |
| 2006/0069783 | A1 | * | 3/2006 | Aihara et al. .................. 709/227 |
| 2007/0028239 | A1 | * | 2/2007 | Dyck et al. ....................... 718/1 |
| 2007/0061779 | A1 | * | 3/2007 | Dowedeit ................. G06F 8/67 717/120 |
| 2007/0067296 | A1 |   | 3/2007 | Malloy et al. |

(Continued)

FOREIGN PATENT DOCUMENTS

WO     2009082386 A1    2/2009

*Primary Examiner* — Anthony Mejia
(74) *Attorney, Agent, or Firm* — Fabian Vancott; Steven L. Nichols

(57) ABSTRACT

A method for allocating processing of an application performed by a computing system made up of a plurality of interconnected physical computing devices includes executing an application on a first application server associated with the computing system, the application having a number of modular software components; while executing the application, measuring processing resources consumed by one of the modular software components; and in response to one of the modular software components consuming an amount of processing resources defined by a criterion, deploying the one of the modular software components to a second application server associated with the computing system.

20 Claims, 5 Drawing Sheets

(56) References Cited

U.S. PATENT DOCUMENTS

| | | | |
|---|---|---|---|
| 2007/0143460 A1* | 6/2007 | Ben-David | G06F 9/505 709/223 |
| 2007/0169049 A1 | 7/2007 | Gingell et al. | |
| 2008/0021994 A1* | 1/2008 | Grelewicz | G06F 11/3428 709/224 |
| 2008/0071922 A1* | 3/2008 | Chetuparambil | G06F 9/547 709/236 |
| 2008/0127234 A1* | 5/2008 | Hesmer | G06F 9/547 719/330 |
| 2009/0271498 A1* | 10/2009 | Cable | 709/219 |
| 2010/0211958 A1* | 8/2010 | Madison et al. | 718/105 |
| 2010/0223217 A1* | 9/2010 | Little | 706/19 |
| 2010/0318609 A1* | 12/2010 | Lahiri | G06F 9/5072 709/205 |
| 2011/0119668 A1* | 5/2011 | Calder et al. | 718/1 |

* cited by examiner

APPLICATION PROCESSING ALLOCATION IN A COMPUTING SYSTEM

BACKGROUND

Aspects of the present invention relate in general to cloud computing systems and more particularly, to allocating the placement of software application components throughout a cloud computing system.

A cloud computing system is a group of autonomous computing systems connected to each other through a network such as the Internet. In such a system, the processing resources of the constituent computing systems may be dynamically scalable and often virtualized. A virtual resource is a piece of software designed to emulate a piece of hardware. The use of virtual resources may increase the efficiency of a cloud computing system, since details relating to the implementation of software applications running on the system and the hardware that supports them may be delegated among the computing systems in the cloud computing system and abstracted to the end user. In such a system, a user may access computer applications through the network and have it appear as though the application is running on his or her local machine.

The execution of software applications in a cloud computing system is often performed by a number of application servers. Each application server maintains its own physical processing resources, including one or more processors and memory. These resources may be configured to process application request from client systems connected to the network. Due to the complex nature of the implementation details in cloud computing systems, it may be difficult to effectively and dynamically manage the allocation of computing resources in a cloud computing system among the various tasks associated with executing software applications.

BRIEF SUMMARY

A method for executing an application on a computing system having a plurality of interconnected physical computing devices includes executing an application on a first application server associated with the computing system, the application comprising a number of modular software components; while executing the application, measuring processing resources consumed by one of the modular software components; and in response to one of the modular software components consuming an amount of processing resources defined by a criterion, deploying the one of the modular software components to a second application server associated with the computing system.

A computing system includes a first application server and a second application server communicatively coupled to the first application server. A processor associated with the first application server is configured to execute an application, the application comprising a number of modular software components; during execution of the application, measure a use of a processing resource by one of the modular software components; and in response to the one of the modular software components consuming an amount processing resources defined by a criterion, deploy one of the modular software components to be processed by a processer associated with the second application server.

A computer program product for allocating processing of an application performed by a computing system comprising a plurality of physical computing devices includes a computer readable storage medium having computer readable code embodied therewith. The computer readable program code includes computer readable program code configured to execute an application on a first application server associated with the computing system, the application comprising a number of modular software components; computer readable program code configured to measure processing resources consumed by one of the modular software components during execution of the application; and computer readable program code configured to deploy the one of the modular software components to a second application server associated with the computing system in response to the one of the modular software components consuming an amount of processing resources defined by a criterion.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
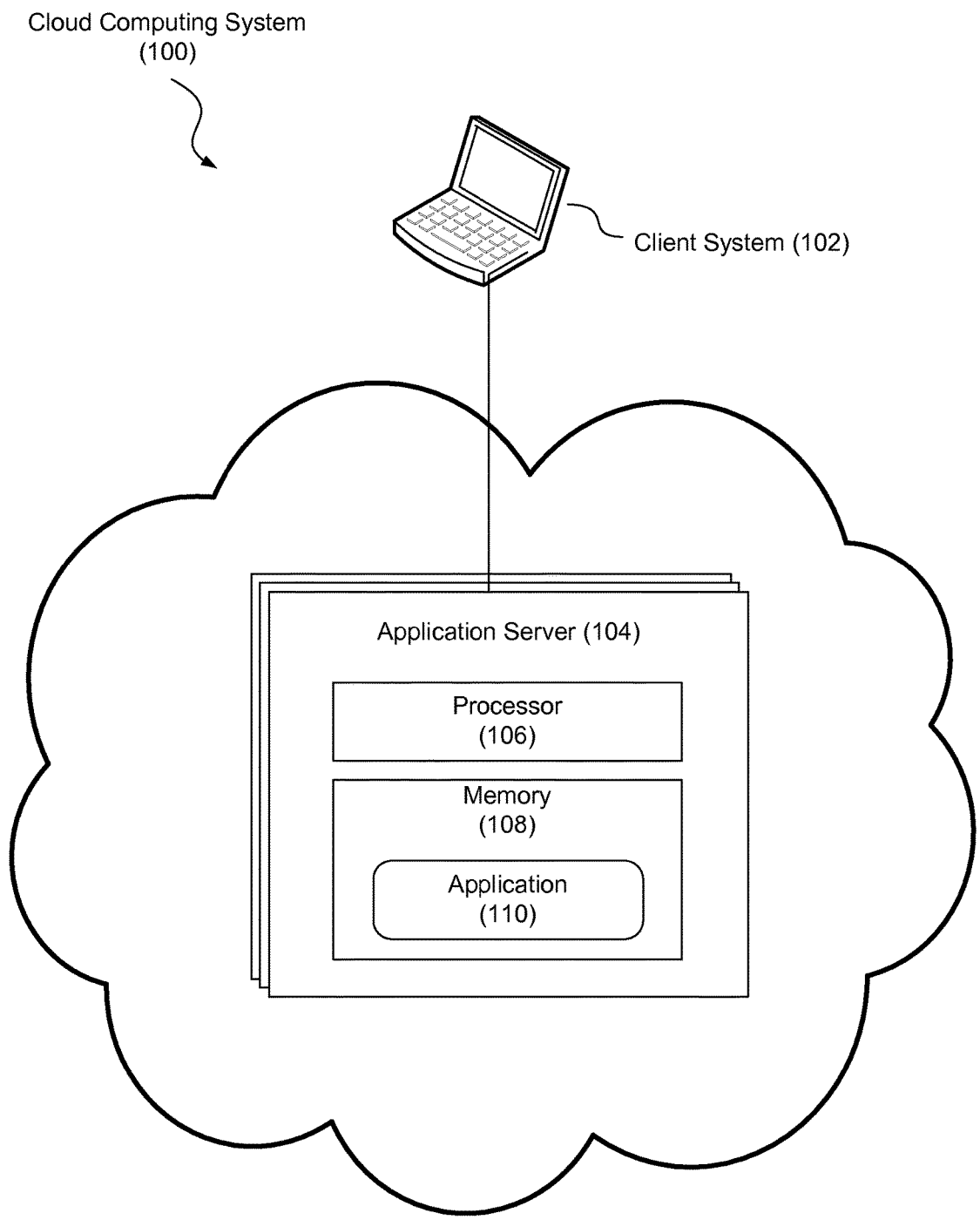
FIG. 1 is a diagram showing an illustrative cloud computing system, according to one embodiment of principles described herein.

The present specification discloses methods and systems for allocating the processing of software applications over a cloud computing system. According to certain illustrative embodiments, a software application request may be sent from a client to the cloud computing system. The application may then be executed on an application server associated with the cloud computing system. The application may be divided up into a number of modular components. During execution of the application, the cloud computing system may determine that one of the application's modular components is consuming a substantially greater amount of processing resources than the other modular components. As a result the processing of that particular modular component may then be transferred to an alternate application server. This may be done using a transport mechanism such as a remote request dispatcher.

A cloud computing system embodying principles described herein may have the characteristic of reduced execution time for software applications. If a particular modular software component of an application is consuming more resources than the other components, it may be preventing the overall application from realizing its maximum processing efficiency. By deploying a resource intensive modular component to an alternate application server which might not be processing as big of a load, the processing efficiency of the application may be increased.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "cloud computing system" is to be broadly interpreted as a number of physical computing systems operating on a network to provide processing resources to a client system connected to the network.

Throughout this specification and in the appended claims, the term "modular component" when used in association with a software application is to be broadly interpreted as a piece of program code which is able to be processed independently.

Referring now to the figures, FIG. 1 is a diagram showing an illustrative cloud computing system (100). According to certain illustrative embodiments, a cloud computing system (100) may include a number of application servers (104). Each application server may have a processor (106) and a memory (108). A client system (102) connected to the cloud computing system (100) may be able to access software applications (110) stored on one of the application servers (104).

As mentioned above, a cloud computing system (100) is a group of physical computing systems connected over a network which are used to provide application processing to an end user. The implementation of the hardware performing the processing of the applications is typically abstracted to the user. The implementation of the network structure often allows the cloud computing system to be dynamically scalable. A scalable system is able to increase its capacity without negatively affecting the overall throughput of the system.

Cloud computing systems typically offer business type application processing to a variety of organizations and businesses. Using a cloud computing system instead of putting out the initial capital expenditure for the hardware, software, training and labor costs may save a company a fair amount of money. The company may simply be billed for the processing use of a cloud computing system. In some cases, a business or organization may wish to have their own cloud computing system. This is typically referred to as enterprise cloud computing. An enterprise cloud computing system allows a business to maintain a greater control over their computing systems. Employees of a business or members of an organization may access the enterprise cloud computing system from various terminals connected to the system. An enterprise cloud computing system may allow an organization to customize their systems to their specialized needs.

An application server (104) is a software framework implemented on a physical computing system which is designed to process scripts, routines, and programs involved with the construction of software applications (110). An application server (104) may make its resources available through an Application Programming Interface (API). The API may indicate how various resources are to be called. The physical computing system running the application server may also run other types of servers such as database management servers and storage servers.

A typical physical computing system such as a server generally includes a form of memory (108). There are many types of memory available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of data and software. Software is a set of data in the form of instructions which are to be executed by a processor (106).

An application server (104) may be configured to respond to requests from a client system (102). A client system may have a web browser installed thereon allowing a user to access a web application (110) from an application server (104). In some cases, a client system (102) may have a piece of software installed thereon which is configured to request resources from an application server (104).

Figure 2:
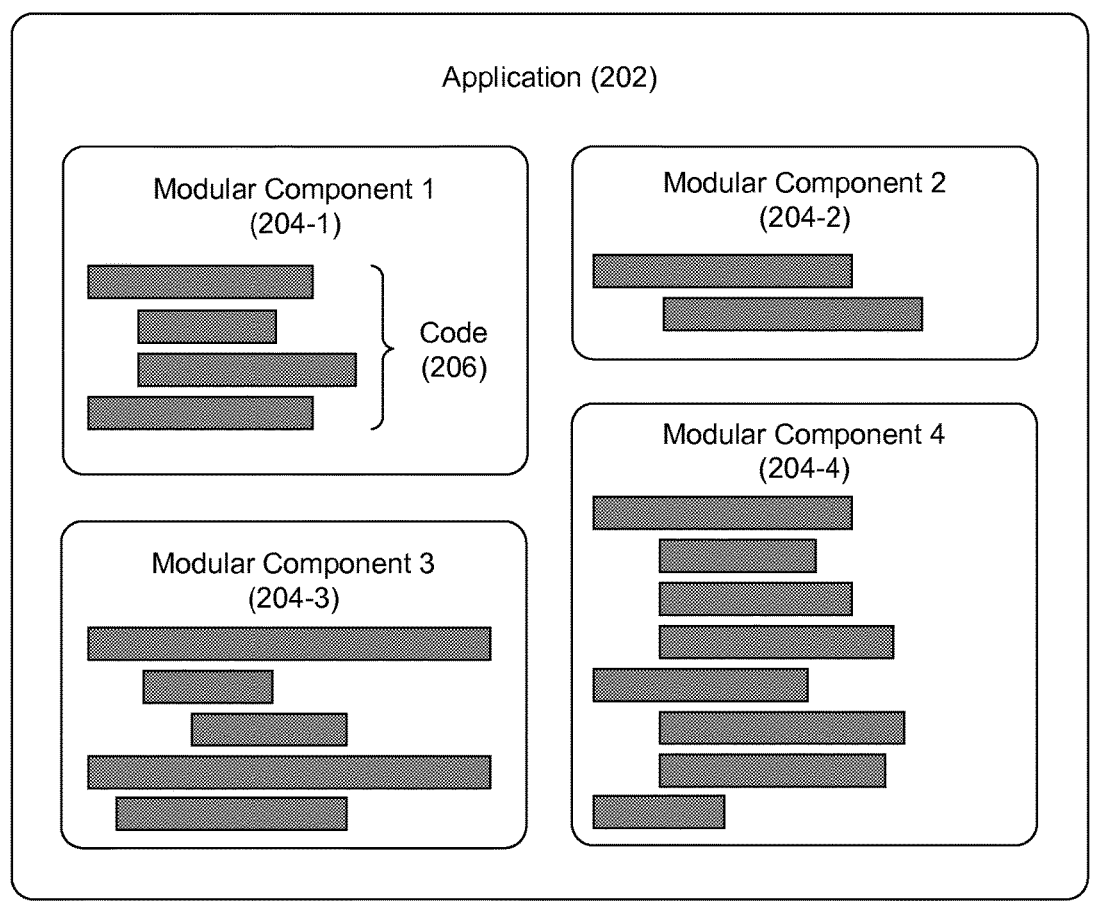
FIG. 2 is a diagram showing an illustrative computer application structure having modular components, according to one embodiment of principles described herein.

FIG. 2 is a diagram showing an illustrative computer application structure (200) having modular components. According to certain illustrative embodiments, a software application (202) may include several modular components (204), each modular component (204) including computer readable program code (206) configured to perform a function for the software application (202).

The program code (206) for software applications may be written in a high level language such as Java or C++. A compiler is then used to translate the high level language into an assembly language. The assembly language may be specific to a particular instruction set architecture. An assembler is then used to translate the assembly code into machine code. The machine code may be in a format that is able to be executed by a processor associated with the instruction set architecture. The high level language allows the lower level implementation details of the computing system to be abstracted to the developer. A web application developer may need only to be familiar with the higher level language.

Many web applications may be designed modularly. That is, a web application (202) may be divided into multiple components (204-1 to 204-4), such that each component (204-1 to 204-4) is processed independently. Each modular component (204-1 to 204-4) may serve a separate function within the application (202). There may be many methods of dividing an application (202) into modular components (204-1 to 204-4).

One example of a modular component (204-1 to 204-4) is a Java servlet. A Java servlet is a programming object designed to dynamically process requests and construct responses. Java servlets allow for dynamic content to be generated for various web pages. For example, a user accessing a particular website may be provided with different information than another user accessing the same website. The difference in content may be determined by credentials associate with each user. Other technologies such as .NET and Personal Home Page (PHP) may also be used to create modular components (204-1 to 204-4).

Figure 3:
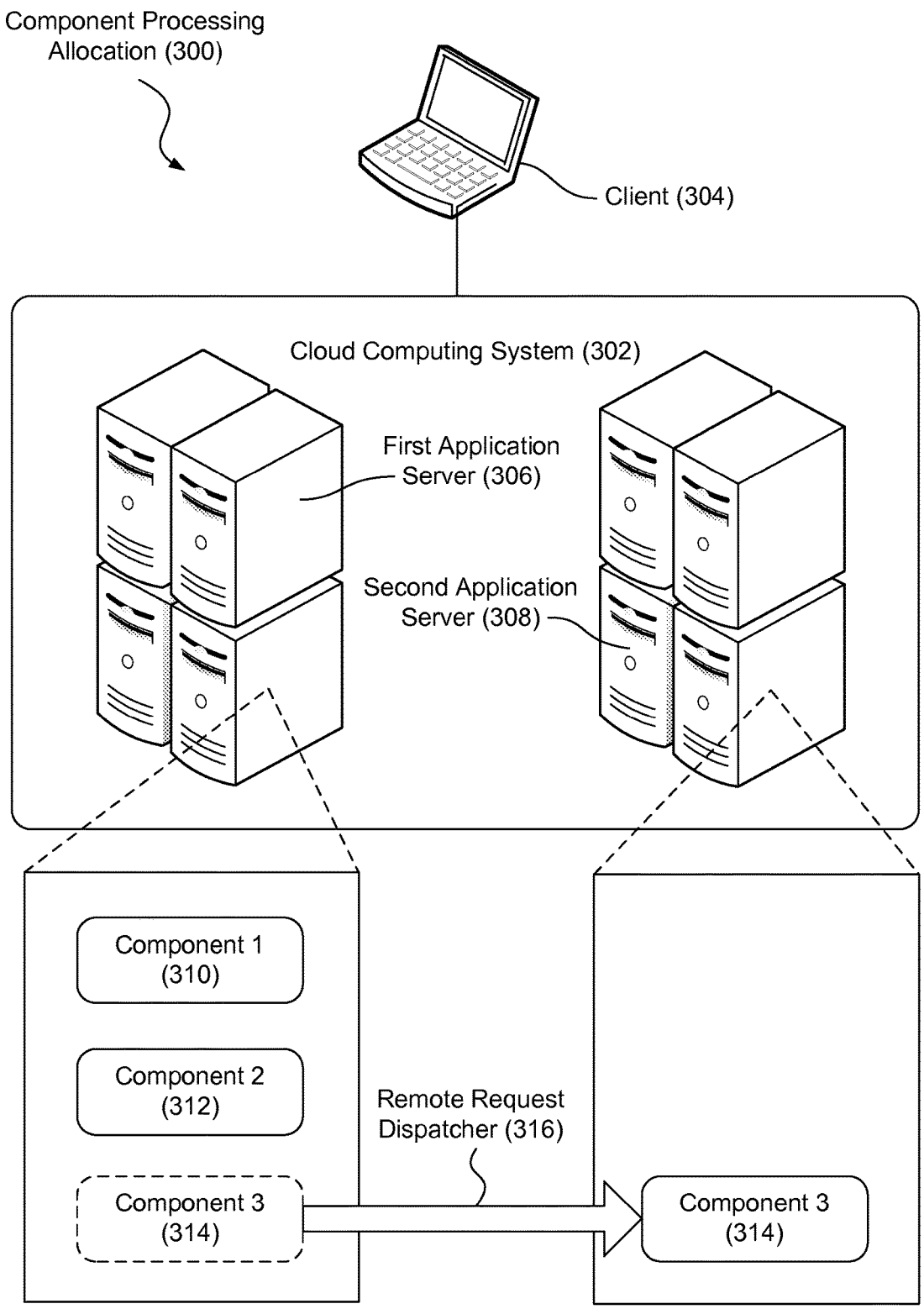
FIG. 3 is a diagram showing an illustrative process of software component processing allocation, according to one embodiment of principles described herein.

FIG. 3 is a diagram showing an illustrative process of software component processing allocation. According to certain embodiments, a client system (304) may initiate execution of an application within the cloud computing system (302). The application may initially be executed by a first application server (306). After a predetermined amount of time, the first application server (306) may determine that a particular component (314) of the application is consuming more processing resources than the other components. As a result, the high consuming component may be deployed to a second application server (308). This may be done by activating a remote request dispatcher (316).

When a client system first requests execution of an application from the cloud computing system (302), the application may be initially deployed to one of several application servers (306, 308) associated with the cloud computing system (302). Various methods may be used to determine which application server receives the initial deployment. For example, the cloud computing system may determine which application server is least being used. That application server may then receive the initial deployment of the application.

After an application has been deployed to the first application server (306), various metrics may be used to determine how each component is performing. For example, a particular metric may measure the average time in clock cycles it takes to complete an instruction associated with the component. Additionally or alternatively, a metric may determine the time in seconds for a response to be received after a request has been sent.

In one example, it may be determined that component 3 (314) has a higher latency than component 1 (310) and component 2 (312). The degree to which component 3 (314) has a greater latency than the other components (310, 312) may reach a predetermined threshold value. The threshold value may be determined through analysis of network performance over time. It is natural that some components will exhibit a higher latency than others, thus a tolerance in latency may be permitted. However, if the discrepancy in latency becomes too great, the high latency component may be deployed to a second application server (308).

There may be multiple methods for deploying a component of a software application to a separate application server. In certain embodiments, a context sharing mechanism such as a remote request dispatcher (316) may be used. A remote request dispatcher may extend the context in which a modular component operates from a single application server to a multiple application server environment. A detailed description of a remote request dispatcher (316) may be found in the co-pending U.S. patent application Ser. No. 11/533,113 filed on Sep. 19, 2006 by Madhu K. Chetuparambil et al., which is incorporated herein by reference in its entirety.

Figure 4:
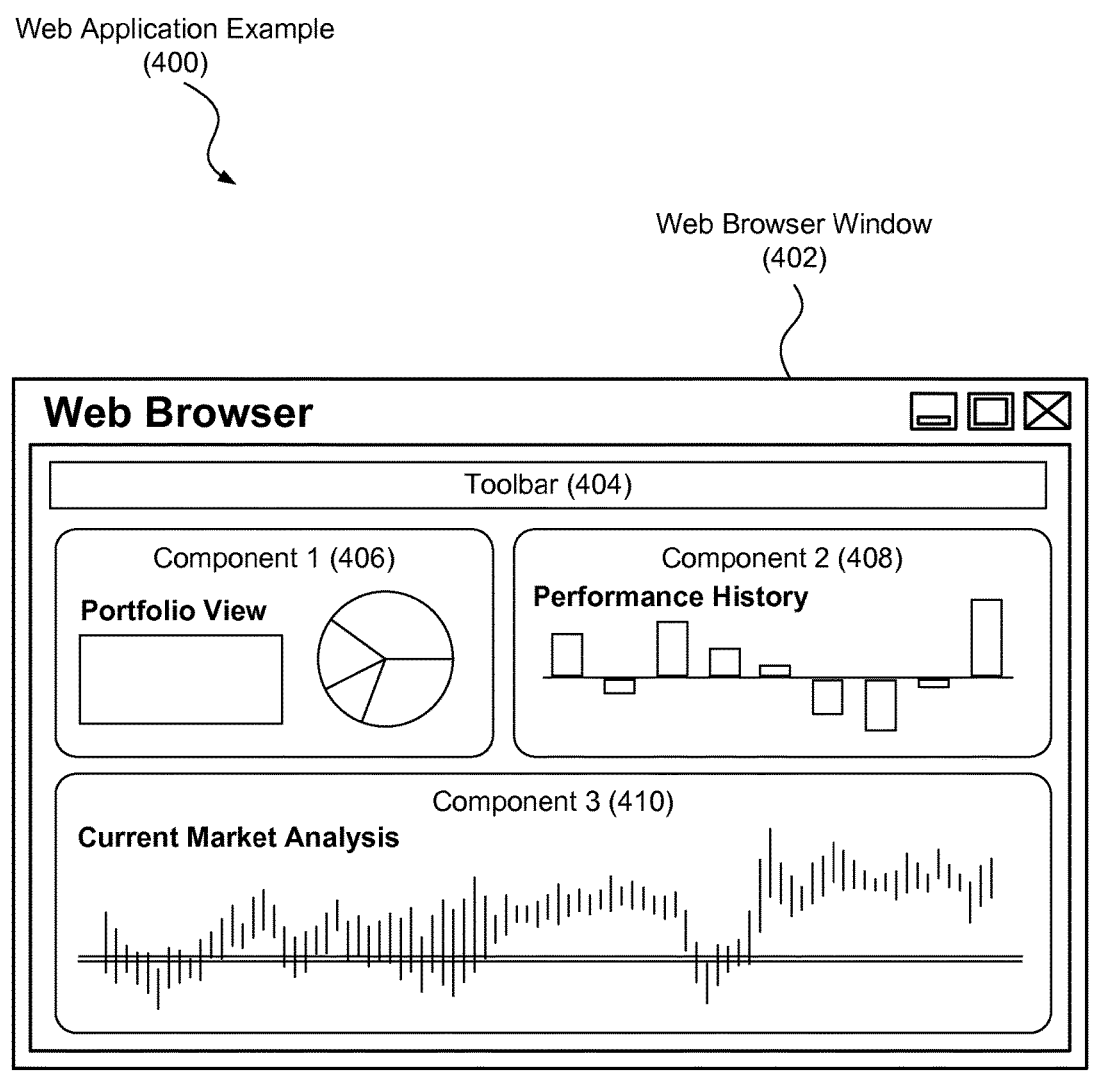
FIG. 4 is a diagram showing an illustrative web application example, according to one embodiment of principles described herein.

FIG. 4 is a diagram showing an illustrative web application example (400). According to certain embodiments, the application may be a web application displayed through a web browser window (402). According to certain embodiments, an investment solutions application may be displayed to a user through the web browser. The display may include three modular components (406, 408, 410), each modular component performing a separate function relating to the application.

A web browser is an application used to retrieve and present resources from the Internet. Through a web browser, a user may access various web sites and web applications. The example shown in FIG. 4 depicts an illustrative portfolio management application. The web browser window may display to a user a toolbar as well as various functions related to the application. For example, modular component 1 (406) may display an overall portfolio view, modular component 2 (408) may display a performance history, and modular component 3 (410) may display a current market analysis.

Each modular component (406, 408, 410) requires processing resources to perform its intended function. According to principles described herein, the cloud computing system may determine that component 2 (408) is exhibiting high latency and slowing down the rest of the application. Consequently, the program code used to perform functions associated with component 2 may be deployed to a separate application server. Doing so may reduce the latency experienced by component 2 and thus the efficiency of the overall application may be increased.

Figure 5:
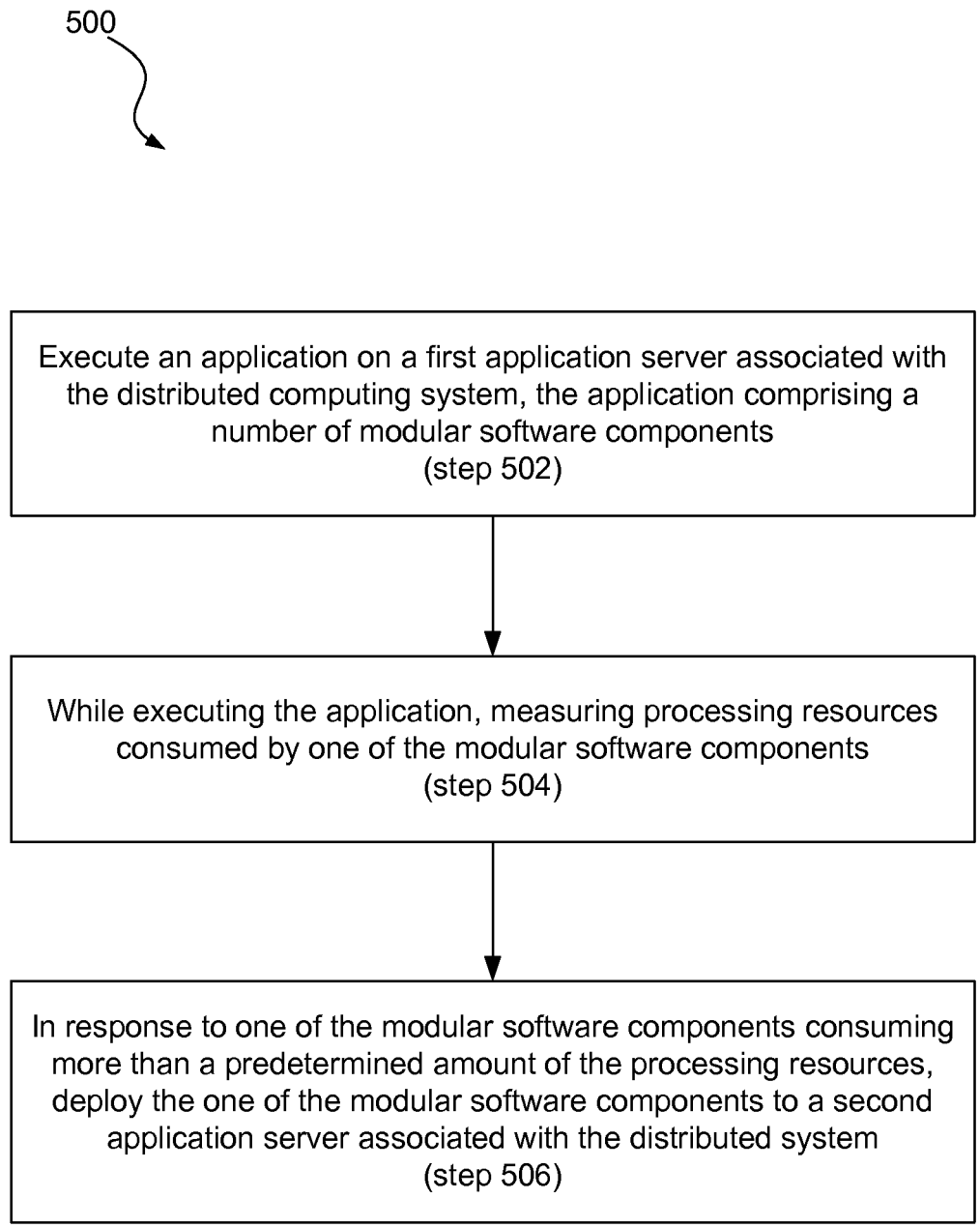
FIG. 5 is a flowchart showing an illustrative method for allocating processing of an application performed by a cloud computing system, according to one embodiment of principles described herein.

FIG. 5 is a flowchart showing an illustrative method for allocating processing of an application performed by a cloud computing system. According to certain embodiments, a method for allocating processing of an application performed by a cloud computing system comprising a plurality of physical computing systems includes executing (step 502) an application on a first application server associated with the cloud computing system, the application comprising a number of modular software components; while executing the application, measuring (step 504) processing resources consumed by one of the modular software components; and in response to one of the modular software components consuming more than a predetermined amount of the processing resources, deploying (step 506) the one of the modular software components to a second application server associated with the cloud computing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for allocating processing of an application performed by a computing system comprising a plurality of interconnected physical computing devices, the method comprising:
   executing, during an execution period, an application on a first application server associated with said computing system, said application comprising a plurality of modular software components, with the plurality of modular software components including a first modular software component and a second modular software component;
   measuring a first set of performance metric value(s) for the first modular software component with respect to the execution period;
   measuring a second set of performance metric value(s) for the second modular software component with respect to the execution period;
   determining that the first set of performance metric value(s) indicates less favorable performance than the second set of performance metric value(s); and
   responsive to the determination that the first set of performance metric values(s) indicates less favorable performance, re-deploying said first modular software component from the first application server to a second application server associated with said computing system using a remote request dispatcher (RRD);
   wherein the re-deployment of the first modular software component includes building an RRD request object on the first application server, and
   sending, by the first application server, the RRD request object to the second application server to transfer processing of the first modular software component to the second application server.

2. The method of claim 1, wherein a measured performance metric is latency.

3. The method of claim 1, in which said deploying said first modular software component to said second application server comprises activating a context sharing mechanism.

4. The method of claim 1, in which said computing system comprises an enterprise cloud computing system.

5. The method of claim 1, in which said second application server is one of a plurality of application servers, and one of said modular software components being deployed to said second application server responsive to said second application server consuming a smaller amount of its own processing resources than any other application server in said plurality of application servers.

6. The method of claim 1, in which at least one of said first application server and said second application server executes said application through a virtual machine.

7. The method of claim 1, in which said modular software components comprise at least one of: Java servlets, hypertext preprocessor (PHP) software components, and .NET software components.

8. A computing system comprising:
a first application server; and
a network interface for the first application server to provide communication with a second application server communicatively coupled to said first application server;
in which a processor associated with said first application server is configured to:
execute an application, said application comprising a plurality of modular software components, with the plurality of modular software components including a first modular software component and a second modular software component;
during an execution period of said application, measure a first set of performance metric value(s) for the first modular software component with respect to the execution period;
measure a second set of performance metric value(s) for the second modular software component with respect to the execution period;
determine that the first set of performance metric value(s) indicates less favorable performance than the second set of performance metric value(s); and
responsive to the determination that the first set of performance metric values(s) indicates less favorable performance, transfer said first modular software component to said second application server to be processed by a processer associated with said second application server;
wherein transferring said first modular software component to be processed by said second application server is conducted by a remote request dispatcher (RRD).

9. The system of claim 8, wherein a measured performance metric is latency.

10. The system of claim 8, in which said transferring said one of said modular software components to said second application server comprises activating a context sharing mechanism.

11. The system of claim 8, in which said computing system comprises an enterprise cloud computing system.

12. The system of claim 8, in which said second application server is one of a plurality of application servers, said one of said modular software components being deployed to said second application server responsive to said second application server consuming a smaller amount of its own processing resources than any other application server in said plurality of application servers.

13. The system of claim 8, in which a virtual machine associated with at least one of said first application server and said second application server is used to process said application.

14. A computer program product for allocating processing of an application performed by a computing system comprising a plurality of physical computing devices, said computer program product comprising:
a non-transitory computer readable storage medium having computer readable code embodied therewith, said computer readable program code comprising:
computer readable program code configured to execute an application on a first application server associated with said computing system, said application comprising a plurality of modular software components, with the plurality of modular software components including a first modular software component and a second modular software component;
computer readable program code configured to measure a first set of performance metric value(s) for the first modular software component during execution of said application;
computer readable program code configured to measure a second set of performance metric value(s) for the second modular software component with respect to the execution period;
computer readable program code configured to determine when the first set of performance metric value(s) indicates less favorable performance than the second set of performance metric value(s) by a predetermined threshold; and
computer readable program code configured to re-deploy said first of said modular software components from the first application server to a second application server associated with said computing system in response to a determination that the first set of performance metric values(s) indicates less favorable performance by said predetermined threshold, said code comprising a remote request dispatcher (RRD); and
wherein re-deploying said one of said modular software components to a second application server comprises:
identifying a remote resource on a remote module on the second application server based on a reference associated with a resource on the first application server;
creating an RRD request object;
sending the RRD request object to the second application server;
receiving a response to the RRD request from the second application server; and
presenting contents of the response including a description of the available contents, response output, and response state of the second application server to be made available to the resource of the first application server.

15. The computer program product of claim 14, wherein a measured performance metric is latency.

16. The computer program product of claim 14, in which said deploying said one of said modular software components to said second application server comprises activating a context sharing mechanism.

17. The computer program product of claim 14, in which said second application server is one of a plurality of application servers, said one of said modular software components being deployed to said second application server responsive to said second application server consuming a smaller amount of its own processing resources than any other application server in said plurality of application servers.

18. The method of claim 1, further comprising:
   receiving a response to the RRD request from the second application server; and
   presenting contents of the response including a description of the available contents, response output, and response state of the second application server to be made available to the resource of the first application server.

19. The method of claim 1, further comprising transferring the first modular software component from the first application server to the second application server using the RRD.

20. The method of claim 2, further comprising using a tolerance for expected latency in determining whether to deploy the first application server to the second application server.

* * * * *